Feb. 6, 1951 J. K. SELDEN 2,540,354
METHOD OF MAKING POROUS BODIES
Filed April 23, 1946 2 Sheets—Sheet 1
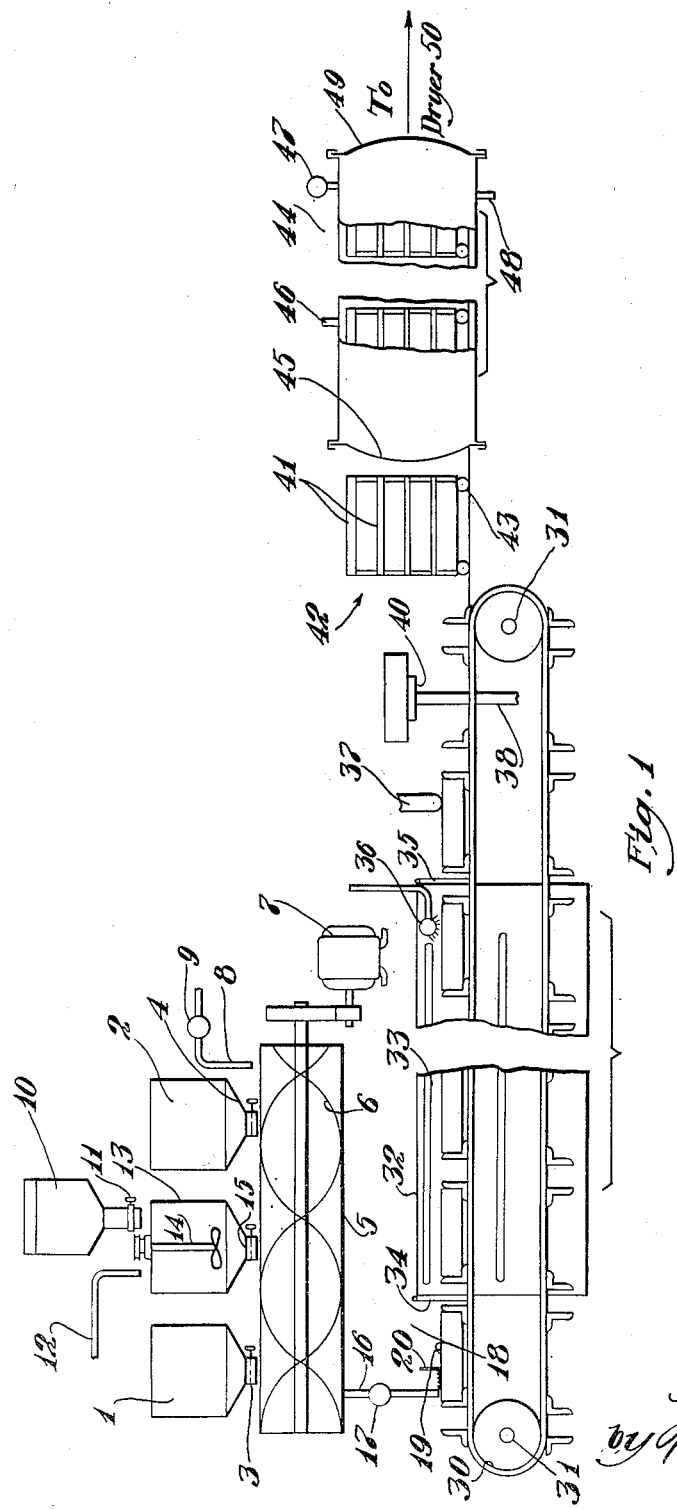
Inventor
John K. Selden
by Roberts, Cushman & Groves
Att'ys.

Feb. 6, 1951       J. K. SELDEN       2,540,354
METHOD OF MAKING POROUS BODIES
Filed April 23, 1946       2 Sheets-Sheet 2
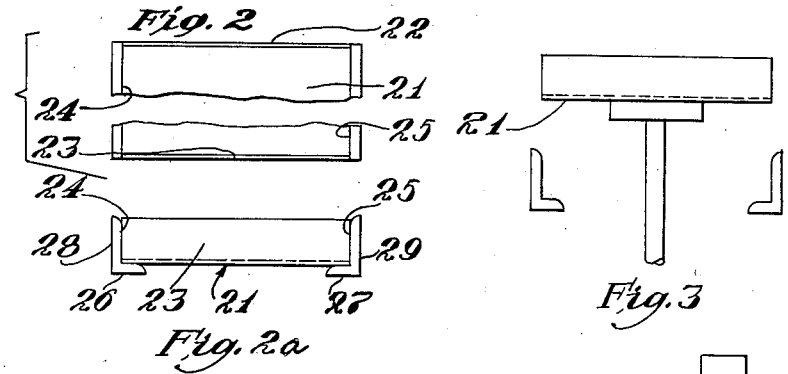
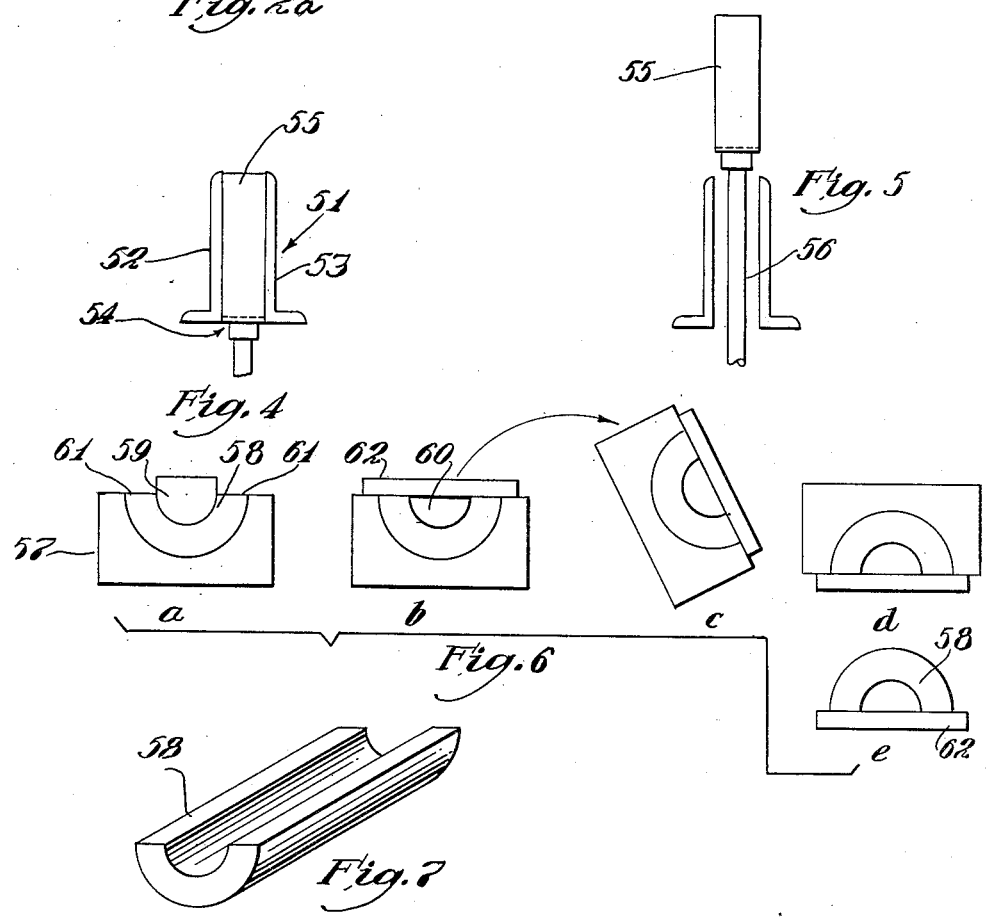
Inventor
John K. Selden
by Roberts, Cushman & Groves
Att'ys.

Patented Feb. 6, 1951

2,540,354

UNITED STATES PATENT OFFICE 2,540,354

METHOD OF MAKING POROUS BODIES

John K. Selden, Berlin, N. J., assignor to Owens-Illinois Glass Company, Toledo, Ohio, a corporation of Ohio Application April 23, 1946, Serial No. 664,257

9 Claims. (Cl. 18—47.5)

This invention relates to a method of making porous bodies, derived from integrated finely divided solid particles and having light-weight, high strength, and heat-insulating characteristics.

In the prior art it has long been known in practice that numerous finely divided solid materials may be mixed with a liquid such as water to form a fluid slurry or plastic mixture which is susceptible to shaping and may be shaped as desired and then hardened from its acquired shape into an integrated solid mass. Such procedure is common to the ceramics and cementitious or molding arts.

In such procedures a fundamental dividing line may be drawn between the mixtures of finely divided solids and liquids in which the solid particles are close-packed or in direct contact with each other and occupy approximately the same volume as they do in a dry condition—and in which the liquid just wets the surfaces or just fills the interstices; and mixtures of finely divided solids and liquids in which the solid particles are spaced further apart from each other than they are in the dry mixture, and hence are dispersed by the liquid, so as to occupy a substantially greater volume than the solid particles did or would in dry condition.

Close-packed wet mixtures of the first category are almost, if not quite, self-sustaining and form-retaining, and not subject to serious or appreciable shrinkage upon removal of the liquid.

Liquid dispersions of fine particles, of the second category, are not self-sustaining or form-retaining but fluid rather than plastic. Moreover, they are normally subject to shrinkage upon removal of the liquid, and to spontaneous separation of the liquid from the solid particles or to segregation of the solid particles from one another, upon standing only.

In consequence of these facts, mixtures of the first category may be shaped and then hardened without very great difficulty. But mixtures of the second category present great difficulty in maintaining them in predetermined shapes and dimensions while hardening them after forming them to the shapes and dimensions required.

In such operations the integration and hardening of the mixtures involve heat, chemical reaction between the components of the mixture and separation of the liquid component, which is usually water. By the present practices of the art all of these changes occur indiscriminately and the composite result upon the mixture as a whole, in order to effect integration, is substantially out of control of the operator in respect of one or more factors, during the progress of the operations, so that the resulting product will be found to have lost the shape, dimensions, homogeneity, strength, porosity (i. e. the original dispersion of solid particles in the liquid suspending medium) or other desired properties, to an unpredictable and ungovernable degree.

To promote and preserve the uniformity of such solid-liquid mixtures, it has been proposed to develop the viscosity of the original fluid mixture in various ways, and thus to prevent settlement of the solids from the liquid or the segregation of the solid particles, due to relative size or specific gravity, or both. But such increases in viscosity or consistency interfere with the successful and satisfactory shaping of the mixture, even if the particles are close-packed but especially so when they are in dispersion in the liquid. This results in non-conformity, in shape or dimensions, occlusions of air, segregation, settlement, selective flow, stresses, strains, cracks and the like, which become manifest in the ultimate hardening of the mixture, if not before.

A specific class of solid-liquid mixtures, to which the foregoing characteristics directly apply, is that of finely divided particles of lime and silica, in water. Of the close-packing category of such lime-silica-water mixtures those used in making sand lime bricks are typical. Of the dispersive category, lime, silica and water slurries are representative. It is common practice, in the manipulation of compositions of both categories, to shape the mixtures to the desired form and then to subject the formed mass or charge to heat, sufficient in degree and length of time to effect integration and hardening of the whole into the final product desired. In so doing many difficulties are encountered. They are alleviated only by compromise of one deleterious action for another, which is, in any given instance, considered less serious in view of the ultimate product and the purpose which it is qualified or intended to serve.

It is found, by the present invention, however, that mixtures of finely divided lime and silica in water may be prepared, shaped and integrated in the desired shape and dimensions by a preliminary condition of: effecting uniform admixture of the components in appropriate condition and proportions, imposing the desired shape and dimensions on the resulting mixture, and then effecting a preliminary integration or set of the resulting shaped product, at low temperatures (not substantially exceeding 212° F.), and preferably in an atmosphere substantially saturated with water vapor, to stabilize the same at various regulated surface, form and dimension-maintaining stages, as desired. This may be followed by thereafter developing the ultimate strenth, hardness and like characteristics as required in the final product, without loss of the thus established shape, dimensions and uniformity of composition, by subjecting to induration at super-atmospheric pressures and temperatures above the boiling point of water.

As a criterion of the preliminary integration or setting step in the foregoing procedure for lime-silica-water slurries, it is found that at least a sufficient amount of the silica component must be present to constitute a temporary binder of any given mixture, and to this end it must be in the form of active silica, such as finely divided diatomaceous earth; that the lime component must be in the form of active lime, such as wet-slaked quick-lime, or commercial lime hydrate and that both shall be preferably finely divided, as in the form of a colloidal suspension or milk of lime, in water; and that the active silica and active lime shall be present in sufficient absolute and relative amounts to react rapidly and to form the desired amount of calcium hydrosilicate to constitute an adequate binder component of the charge as a whole in the preliminary setting stage, that is, at temperatures not substantially exceeding 212° F. and in a time interval not exceeding that in which undesirable de-watering of the charge in question may occur by settling or leakage, or segregation of the solid components of the charge, by gravity.

To summarize, therefore, it is found that a mixture of finely divided solids and water, containing finely divided active silica and finely divided active lime, and water in proportions of spaced dispersion of the solid particles may, by successive mixing, shaping, and pre-setting, be stabilized in the ultimate shape and dimensions desired and subsequently indurated, without relative change of its physical attributes or uniformity of composition.

The time of mixing of the preliminary composition is thus directly related to and must not seriously exceed the time within which the mixture would undergo appreciable serious thickening before shaping. The time of shaping and pre-setting of the preliminary mixture must likewise not appreciably exceed the time within which the mixture would undergo a serious degree of de-watering, as by settling or leakage, or of segregation, by gravity and the like, before setting. It is also important that the relationship of the volume of water to the volume of solid particles contained in the preliminary mixture shall be such as to yield a consistency which will permit free flowing or pouring and shaping. To this end, this ratio is found to be at least 1:1, by weight, leading to a product of an apparent density of about 50 pounds per cubic foot, at most. A further important discovery is that, while such conditions should obtain in the preliminary mixture at room or atmospheric temperature, for sufficiently long a time so that pouring and shaping may be effected, the active lime and active silica should and may be competent to react in the mold at temperatures below or at or about the boiling point of water, in a time interval not substantially greater than the time period of settling and/or segregation of the lime-silica-water mixture in question. Preferably such pre-setting is accomplished at approximately the boiling point of water, that is, 180° F. to not substantially over 212° F. at atmospheric pressure.

It is also important that a sufficient amount of active lime and active silica shall be present, so that, upon reaction (and preferably upon completion of the pre-setting action), a sufficient structure of sufficient strength shall be formed to render the charge as a whole self-sustaining and form-retaining, either alone or in conjunction with the remaining constituents of the charge.

But, within such limitations of composition and proportions, and by such procedure, it is now found that lime-silica-water compositions may be prepared in liquid dispersion, shaped as desired, and given a rapid preliminary set whereby the primary characteristics of the mixture are stabilized to substantially the ultimate size, shape and structural characteristics, such as homogeneity, integration and porosity, and thereafter indurated, without danger of losing those desirable attributes initially incorporated in the fluid or plastic charge, and especially with respect to the solids components thereof, and finally deprived of its free water component when, as and if it is desirable or necessary to remove it.

For example, an aqueous lime-silica-water slurry containing sufficient diatomaceous earth may be prepared of a pourable consistency, poured into a mold, and subjected to a temperature of about 212° F. If it is poured to a depth of one inch, it is found that it will be pre-set to stable form sufficient for removal of the molds by such treatment within an hour. If poured to a depth of 3 inches it will pre-set to stable, self-sustaining form-retaining consistency in two hours. Greater depths are likewise practicable and vertical casting of shapes is applicable in accordance with the present invention. Likewise, lesser and greater degrees of pre-setting may be sufficient and advantageous for some specific purposes.

Accordingly, the critical condition in the composition and preparation of the preliminary mixture is that it shall not de-water, as by appreciable settling or segregation, with respect to its solids constituents, or leakage of the water through joints in the mold, in a shorter time than the pre-setting period required. This is in large part accomplished by the pre-setting of the active silica and the active lime. With both of these materials, the more finely divided the particles the longer these dispersion periods will be and the more dilute the water/solids ratios may become and still preserve substantial homogeneity of the preliminary mixtures with water.

Other ingredients may be incorporated into these mixtures advantageously to contribute to their original characteristics or to impart others. Thus, finely divided fibrous materials, such as inorganic asbestos fibers or organic fibers of cellulose, such as paper pulp or the like, may be added, and in even very small amounts they will prolong the settling and segregation periods of the preliminary mixture and the homogeneity of the whole during preliminary setting.

Again, non-reactive silica—or silica in a form which does not react in the preliminary setting treatment, such as finely crushed or ground quartz—may be added. Though inert in the pre-setting treatment, it may nevertheless become reactive and extremely effective in the subsequent induration at higher temperatures.

In a similar manner other finely divided solids or other materials may be added to and incorporated in the preliminary lime-silica-water mixture, so long as they do not introduce deleterious action or interference with the desired reactions and properties of the main components bringing about pre-setting. Thus, for example, clays, shale, pozzuolonic materials, cements, and other materials which may react under induration conditions may be added, as well as inert filler materials.

Various fundamental advantages accrue from the nature of the present invention in addition to the principal element of control which it gives over the preliminary mixtures, the development and stabilization of the ultimately desired attributes therein and the wide range and uniformly improved and dependable qualities of the ultimate products which may be obtained thereby.

Among these advantages may be mentioned the fact that the mixture after the preliminary setting stage may be further shaped and trimmed to accurate dimensions and even surface finishes imparted thereto which are required or desired in the final product and they will be preserved during subsequent induration. A very great practical advantage is that, after the preliminary set of the mixture of the form-retaining stage, the stabilized and integrated charge may be removed from its mold or other retaining means, which may then be returned for re-use instead of continuing as a container through the subsequent induration stage of the process, which is ordinarily much longer. Moreover, the surfaces of the pre-set charge are at a very early stage developed to sufficient firmness to resist slopping of the charge as a whole or across its surface. It is also rendered resistant to drops of condensate—which may form and drop onto it from above—when subjected to steam induration directly, for example. Moreover, the pre-set pre-formed charge, at various stages of its setting, may be manipulated with or without withdrawing from the pre-setting conditions, such as troweling the surface, removing parts of the retaining walls or molds to expose the corresponding surfaces, or even completely to upset and thus empty the set charge from the mold, or to cut special unmoldable conformations into the partially set mass. The shaped and pre-set or stabilized charge may, accordingly, be treated or even handled as an entity, and considered in many respects the same as the final product. It is of substantially the same shape, dimensions, uniformity of composition and structure or homogeneity. But, in addition, it is sufficiently soft so that further shaping, surfacing and finishing may be effected, as desired, more readily than in the finished product, as indurated to its ultimate degree of hardness and strength.

By virtue of these properties, the shaped and pre-set, stabilized product may be subjected to subsequent induration more readily and freely and yet with greater certainty and confidence of satisfactory results than has heretofore been possible. It may be removed from the molds or other mechanical aids used in shaping and holding it to its shaped form and dimensions, or such aids may be removed from it, as the case may be. It may be transferred from the pre-setting treatment or chamber to the indurating treatment or chamber, and also handled as an entity by itself without danger, though care may, of course, be advisable or necessary. Moreover, it may be stacked, independently or in association with other similarly shaped products, or they may be set on edge or piled one upon another. In this way the space of the indurating chamber may be greatly economized and more effectively utilized, and at the same time all of the surfaces of each shaped object may be exposed most advantageously for the purposes of heat application, transfer and ultimate induration and uniformity of strength, structure and hardness.

Indurating or induration in the present specification and claims comprehends the development of the strength and hardness of the composition in question, after the pre-setting treatment at low temperatures (that is, not appreciably above the boiling point of water) by carrying out the hardening reactions of which it is capable at elevated temperatures, that is, above the boiling point of water, and also at superatmospheric pressures, as, for example, in an atmosphere of steam at 75 lbs. per square inch pressure, or more.

Active silica and active lime include those sources of natural or prepared silica and lime which are typically characterized by being reactive with each other in a medium of liquid water at temperatures not appreciably exceeding the boiling point of water and not exceeding the actual boiling point of the mixture, that is, without causing ebullition of the mixture in any given case. Typical examples of such materials are, respectively, diatomaceous earth and slaked quicklime or commercial hydrate of lime. Both materials should be in finely divided condition and, at least for purposes of calculation, free from other or inert materials—or considered only in respect of the active components.

Just as other materials may be added for purposes other than pre-setting—though possibly functioning to assist it, such as finely divided fibers to promote suspension in the preliminary mixture and thus to provide a prolonged period of time before dewatering by settlement or leakage and before serious segregation occurs—so also other materials may be added which are inert with respect to the steps of mixing and pre-setting of the mixture but which are effective in the subsequent induration of the pre-set charge or object. Thus, finely divided (or coarse) forms of inactive silica, such as ground quartz, may be added. Such forms of silica are not active below 212° F. But at higher temperatures and pressures, as in the presence of steam under superatmospheric pressures, they are reactive not only with the active lime, still available therein, but also with relatively inert or inactive forms of lime and other materials which are not appreciably reactive therewith at the low temperatures of the pre-setting treatment.

The fibrous material used to delay or prevent settlement, or for subsequent reinforcement, etc., will remain substantially inert and unaffected by the indurating treatments and in the final product.

The present invention, though applicable to other compositions and mixtures, is especially effective with those preliminary mixtures of finely divided solids and water in which the volume of water in the slurry (rather than the intrinsic or absolute volume of the solids) substantially determines the overall volume of the mixture and in which, by reaction between the components, the mixture may be made to react and form a solidified structure which shall continue to occupy the volume of the mixture and retain the same shape and dimensions to which it has been made to conform while in a pourable condition. It follows, as a corrolary to such mixtures and shaped products, that the greater the proportion of water to solids which can be thus maintained, preset and solidified without de-watering or segregation, the less the apparent density will be of the finished mass when the (unreacted) water is removed or expelled. In fact, while some of the water may enter into the setting or indurating reaction and remain combined with the set and indurated solids of the charge, this is relatively small or such reaction may not occur. In both cases the apparent density (weight per cubic foot) of the product obtained will be approximately the same as the weight of solids per cubic foot which are present in the preliminary mixture of water and solids. These considerations are generally applicable to the conditions and procedure described in the above disclosure.

A representative example of the operation of the invention in actual practice will be described with respect to a composition for heat insulating blocks or pipe coverings, and as carried out in apparatus more or less diagrammatically illustrated in the accompanying drawings in which:

Fig. 1 is a side view in elevation of a complete sequence of apparatus sufficient for carrying out all of the steps of the complete process;

Figure 2 is a detail plan of a mold and support suitable for casting. Figure 2a is a detail side view of a mold and support suitable for casting.

Fig. 3 is a view of means for lifting the mold and molded blocks vertically from its support;

Fig. 4 is a view of a mold with high sides for casting blocks on edge;

Fig. 5 is a view showing means for lifting or stripping the block from between the sides of the mold in elevated position;

Fig. 6 is a composite view of a mold with a cast section of cylindrical pipe covering therein and successive steps in inverting the same onto a pallet; and Fig. 7 is a view of the molded pipe covering section.

The active silica may be provided in the form of commercial powdered diatomaceous earth. This is somewhat variable both as to particle size and chemical composition. However, its average qualities in both respects are adequate for the general purpose of the present invention. It may be improved by finer grinding and by removing excessively coarse particles, e. g., coarser than 200 mesh, unless these should be desirable for special purposes. In any event, the finely divided or powdered material is delivered into a supply hopper 1.

The active lime component is prepared by slaking quick lime, with violent agitation in three to four times its weight of hot water, care being taken to feed the quick lime into the water slowly enough so that the heat of hydration does not cause excessive boiling. As thus prepared, with regulated and intimate admixture, the resulting milk of lime will constitute a stable suspension of active lime. It is preferable that, if convenient or possible, the suspension of freshly hydrated lime shall be allowed to stand for a period of time, to assure completion of the hydration reaction.

The suspension of lime or milk of lime may be thus prepared in the tank 2, or it may be prepared elsewhere and delivered into tank 2, when ready for use.

The tanks 1 and 2 are provided with outlet valves 3 and 4, whereby the diatomaceous earth and milk of lime, respectively, may be drawn off in any proportions required, into the mixing tank 5 which is located beneath them. This is provided with a pair of helical blades 6 or like agitator means, driven by the motor 7. Additional water, if desired, is introduced in regulated rates and amounts through the pipe line 8 and valve 9. It may be expedient to mount the mixing means upon a platform balance (not shown) and thus directly weigh and determine the relative amounts of the several ingredients as introduced into the mixing mechanism.

If other ingredients are to be introduced into the composition, whether entirely inert or for specific purposes, such as inert silica or silicates (which may be reactive in the indurating treatment) or finely divided fibers to promote and prolong the suspension period of the preliminary mixture, these may also be delivered to the mixer 5. Alternatively, they may be separately prepared and introduced into the previously admixed active silica and active lime components.

Thus, the tank 10 may be provided containing a supply of fine asbestos fibers from which they may be delivered in desired proportions through valve 11, with water from pipe 12, into a mixing tank 13 having a mixing blade 14 and an outlet controlled by a valve 15. This outlet may lead into the mixing tank 5 to introduce the asbestos slurry thereto at any appropriate stage in the mixing operations.

From the mixing tank 5 the dispersion of active silica and active lime (plus the asbestos fiber component when added) in water is delivered through the outlet 16, under control of a quick-acting valve 17, into a mold 18 placed therebeneath.

A representative composition for this preliminary mixture, carrying out the invention and producing an improved light-weight product of high strength for purposes of shaped insulating materials, is as follows (all solids being reduced to finely divided condition and present in uniform dispersion):

|  | Per cent | |
| --- | --- | --- |
| Diatomaceous earth | 50 | 63 |
| Lime (as CaO) | 30 | 37 |
| Asbestos fiber | 20 | -- |
| Total solids | 100 | 100 |
| Water | 600 | 600 |

Such a mixture, therefore, containing the solids in uniform dispersion in the water and of a uniform pouring consistency may be delivered to the mold 18. This is done preferably quickly and so as to promote free, complete and uniform flow to all parts of the mold surface without occlusions of air, flow lines or separations, but so as to form a uniform poured mass and level surface 19. It may be screeded or not, as desired or necessary, as by a trowel or other leveling or smoothing device 20.

As shown in Fig. 2, the mold 18 may be merely a two-sided mold, formed of a sheet metal bottom 21 from which the two sides 22, 23 are formed by bending the metal up to the required height. For purposes of pouring or casting the mixture into the mold, the otherwise open ends 24, 25 are closed by setting the mold onto and between two opposed horizontal angle irons 26, 27, the upstanding portions of which, 28, 29, respectively, serve to form the end walls for the molds, thus closing the open ends 24, 25.

The angle iron supports 26, 27 are preferably transversely mounted upon a pair of parallel conveyor chains 30 (Fig. 1) which are trained over sprocket wheels 31, 31, driven by any suitable mechanism, not shown, to carry the molds, as thus mounted thereon and filled with the fluid dispersion or preliminary mixture, horizontally into the pre-setting chamber 32.

The pre-setting chamber 32 is suitably equipped to apply heat to the filled mold and to heat it and its contents as rapidly as expedient or necessary to a temperature of 180° F. or more and preferably to about 212° F., at substantially atmospheric pressure. To this end it may be surrounded by perforated steam pipes 33 to supply live steam into the chamber. The steam may then be allowed to escape at either or both ends of the chamber, which may simply be closed by loose flaps 34, 35, care being taken to avoid condensate from forming and dripping upon the molded mixture.

The pre-setting treatment is regulated and determined in terms of the composition and characteristics of the prediminary mixture employed, such as the degree of fineness and reactivity of the solid components, the ratio of water to solids, the temperature of the mixture, its period of allowable standing without deleterious settling or segregation, its dimensions and shape, and heat conductivity which influences the time required to transmit heat to and through the charge to a sufficient degree to promote the preliminary setting reaction to the desired degree or to completion.

It may be observed that in general mixtures of finely divided solids and liquids will manifest a marked tendency to separate, or de-water, as by settlement, or by leakage of water or "bleeding" from the molds, if the walls of the molds are not water-tight. This tendency will be greater with greater depths of the mixture, as in vertical casting. However it is largely offset by the pre-setting treatment and the progressive solidification reaction of the active ingredients, such as active silica and active lime and water, in the present case. At an early stage of the pre-setting treatment a gel-like consistency develops throughout the mass which tends to prevent such bleeding of the liquid component.

With the above mixture, for example, and in molds 3" deep and 18" by 36", the time required to effect pre-setting to a self-sustaining and form-retaining consistency sufficient to permit removal of the walls of the mold from the charge is found to be about two hours.

To permit of complete removal of the charge from the mold, handling it, etc., by itself, a longer pre-setting period will be necessary. For some purposes a stiff setting of the surface only, such as to be sufficient to resist drops of condensates which may fall thereon in subsequent induration treatment, will be enough, the charge being then carried through the subsequent induration treatment while contained in the mold, for example. A subordinate degree of pre-setting, which is nevertheless generally very advantageous, is that at or beyond which the mixture has acquired sufficient resistance to prevent slopping in the mold. For example, when subjected to handling, an abrupt stopping or starting otherwise might tend to accumulate the mass in one end of the mold under the momentum of the shock, which would not be subsequently corrected by spreading or flattening out under its own weight.

It is also a highly desirable function, which is accomplished by the pre-setting, to establish both the shape and dimensions of the molded charge to conform to those desired in the finished product, and to stabilize them to a degree of hardness and strength sufficient to preserve these characteristic properties against the normal tendencies and forces of subsequent treatments—especially during shaping, finishing and induration—but also those due to hardening, shrinkage, drying cooling, and handling.

When the desired degree of preliminary setting of the molded mixture has been effected, the mold may be passed along out of the farther side of the pre-setting chamber through the flap 35. Of course it may be preferred to close the pre-setting chamber with doors, positively to exclude air and prevent loss of heat, or even to impose a slight pressure upon the heating medium, such as steam in the chamber. But loosely covered openings are very convenient and for most purposes usually sufficient.

However, upon withdrawing the molded, preliminary set charge into the atmosphere there is a strong tendency to surface evaporation and shrinkage. This may be prevented and the pre-set molded charge left exposed to the atmosphere for a considerable length of time, without damage, by spraying the exposed surface, before withdrawing, with a coating of water from the spray nozzle 36.

On the other hand, when it is desired to remove the charge from the mold, it may be desirable to let the charge undergo a slight shrinkage, under controlled conditions, which is effective to loosen it. It may, therefore, be withdrawn from the pre-setting chamber and allowed to shrink, and then emptied from the mold—or it may be wetted, allowed to cool and shrink more slowly, but still only slightly away from the mold, and then removed.

The top surface of the molded shape may then be trued to size, smoothed and otherwise shaped or brought to the required dimensions and surface characteristics, as by the trowel, or like instrument, indicated at 37.

In the present instance, the molded, pre-set, surfaced charge may be stripped in respect of its two ends, simply by lifting the two-sided mold 18 from its position upon the transverse angle irons 26, 27.

This may be done by the plunger 38 mounted between and beneath the sprocket chains 30. It may be operated by a foot treadle and lever (not shown), thus lifting the mold 18 on the platform 40, from which it may be removed and stacked either by hand or mechanical means, upon the shelves 41 of the truck 42, mounted upon wheels 43, so as to be run, when filled, directly into the indurator 44.

It is contemplated that, instead of removing the molds by hand and transferring them to the indurator, it may be advisable to provide an intermediate closed chamber in which any mechanical operations thereon may be done mechanically and in an atmosphere of steam, air or the like, as desired, and also partial or complete stripping from the molds, wetting, drying shaping, etc. For in its pre-set condition the mixture is not only of its original homogeneity of composition and physical structure, but is or may be made of the ultimately required accurate shape and dimensions, of the finished product. It is—especially when completely pre-set to form and dimension-retaining consistency—stabilized against subsequent change of uniformity of composition and structure, and hence only to be altered in respect of hardness and strength and chemical composition by subsequent induration and finally deprived of its free water, as and to the extent desired in the last operation of drying.

The indurating treatment is, therefore, substantially precluded from likelihood of introducing any serious alterations or defects into the pre-set and shaped mixture, as it has been developed in the molds.

The charge—composed of uniformly dispersed finely divided active and reacted solids (and inactive solids) in a matrix of liquid water, spacing and holding them apart, and in which some of the solid particles are at the same time sufficiently integrated each to each, by chemical and or physical inter-reaction, to hold them together in self-sustaining or form-retaining consistency—is thus developed to exhibit substantially all of the dimensional attributes of the finished product. The ultimate strength (compressive or tensile) hardness and chemical composition or maturity, are developed by higher temperature and pressures, as by direct contact with steam under superatmospheric pressure.

Since the contraction pressures or tensions of drying would at this stage, as indicated above, exceed the strength of the pre-set molded body, it is necessary not to permit more evaporation (or cooling) than that indicated above, which may be permissible to free the charge from the molds so that they may be removed.

Accordingly the substantially saturated, at least superficially integrated and solidified mass, is introduced into an indurator 44, such as an autoclave, by removing the door 45, rolling in the truck 42 with the filled molds 18 thereon, or with the molded objects completely removed from the molds, as the case may be, and loaded onto the shelves 41 in any desired arrangement. The door is then closed. The autoclave is then swept free of air, if air has been permitted to replace steam from the previous charge, and filled with steam, through pipe 46, under a pressure of 75 to 150 pounds per square inch, for example, as indicated by gauge 47. Condensate may be removed through a quick-acting pressure relief or exhaust valve 48 in the bottom. The molds or molded objects are left therein to develop the degree of induration, hardness, strength and other properties, as may be desired or required in the finished product. The steam is then released through exhaust valve 48, ultimately to atmospheric pressure when the door 49 may be released and opened, and the truckload of finished goods withdrawn. The time of induration will vary, but for full induration of the composition described about 12 to 16 hours are sufficient.

It is possible to permit the finished ware to cool and dry under atmospheric conditions. But it is preferable to pass it into a drying chamber (50), as indicated, and to dry the charge by hot air to the desired degree.

As shown in the drawings, instead of molding the usual large flat blocks of insulating material, as shown in Figs. 1, 2 and 3, the preliminary mixture may be poured into a deep mold 51, having high vertical sides 52, 53 on a base 54, thus forming the slab 55 on its side or end as shown in Fig. 4. This may be stripped, after pre-setting, as shown in Fig. 5, by elevating the base of the mold 54 by means of a plunger or the like 56, or the sides of the mold may be stripped away from the molded, pre-set block.

Again, as in the molding or casting of pipe covering insulation, the mixture may be cast into a semi-cylindrical mold 57 to form a semi-cylindrical, hollow shape 58 by inserting the core piece 59, or a semi-cylindrical core piece 60, as shown in Fig. 6 at b. In either case the top surface 61 of the molded shape will be smoothed off somewhat before pre-setting. After presetting to the desired degree, it may be further smoothed off or otherwise finished as to dimensions, shape or surface. The core is removed or a semi-cylindrical core 60 inserted as desired. A pallet 62 is placed upon its upper surface, and the whole, as thus assembled, turned over through the position indicated at c in Fig. 6 to the position indicated at d. In this position the mold may be removed, and the pipe covering, molded to both shape and dimensions, handled and subjected to final induration as required, upon the pallet 62. After induration, of course (if not after presetting), both the core and pallet may be removed leaving the finished product as shown in Fig. 7.

Typical examples of the normal settling rates of water-solid slurries, which are representative of those which are useful in the conduct of the present invention, have been prepared and tested as follows:

I

|  | Per cent |
|---|---|
| Diatomaceous earth | 54 |
| Lime | 31 |
| Asbestos fiber | 15 |
| Water | 500 |

II

|  | Per cent |
|---|---|
| Diatomaceous earth | 64 |
| Lime | 36 |
| Water | 500 |

The solids in each case were finely divided, mixed with the water in a 4-liter beaker, forming a depth of about 8 inches, and allowed to stand. Settling took place as follows, as expressed in percentages of the total height:

| Time of Settling | I | II |
|---|---|---|
|  | Per cent | Per cent |
| 1 hour | 1.5 | 2.0 |
| 5 hours | 4.5 | 7.5 |
| 24 hours | 5.2 | 17 |
| 44 hours | 5.7 | 17.2 |
| 90 hours | 5.5 | 17 |

This table, shows the settling characteristics of the preferred compositions above given, in terms of time and percentage of setting, at atmospheric temperatures.

It will be seen that in both formulations, settlement during a period of five hours between casting and induration, (which might occur between successive chargings of an induration autoclave) might be serious. This is particularly the case in vertical casting due to the greater column through which the solids may settle; likewise in casting re-inforced sections, due to the formation of voids under the re-inforcing elements by settlement or by bleeding.

Leakage of water through holes or cracks in the bottoms of the molds or forms is closely associated with settlement, and both forms of dewatering tend to cease at approximately the same degree of pre-setting. Vertical casting is particularly subject to leakage due to greater hydrostatic head. Any leakage is objectionable in that it permits dripping of the escaped water upon molded articles which are beneath it.

By the present invention, mixtures containing active silica, active lime and water, of freely pouring consistency are cast to desired shapes and dimensions, and the mixture as thus shaped is pre-set, at temperatures not substantially exceeding the boiling point of water. At this stage the shaped mixture, may be removed from its mold or other shaping means, and further manipulated to the final shape and dimensions required. If removed from the mold, it is thus rendered less bulky and less heavy to handle, more readily and directly heated in induration and free to expand or contract. The emptied mold can then be returned immediately for re-use. If left in the mold, the object may be trimmed and surfaced so as to be free to expand or contract with reference to the side walls of the mold, during subsequent induration drying and cooling. Moreover, by further mechanical shaping or surfacing of the object while in the pre-set condition, such operations are not only easier and more accurately performed, and any necessary rejections made before subjecting to the induration treatment, but all of the final shaping of the product (which is now done upon it after induration and drying, and which is not only more difficult but more wasteful of material) is avoided. Furthermore both the shape and the dimensions which are given to the object during or after the pre-setting treatment are accurately retained through the induration treatment and in the finished, completely indurated product.

I claim:

1. Method of making porous integrated materials, which comprises as steps preparing a mixture containing finely divided active silica, finely divided active hydrated lime and water in a water to solids ratio which is greater than 1:1 by weight, to a dispersion of uniformly pourable consistency, shaping the mixture while it is of such consistency, and at substantially atmospheric temperature and subjecting the thus shaped mixture to a preliminary setting, at a temperature approximating the boiling point of water, substantially without evaporation of water therefrom and before substantial de-watering or segregation has taken place.

2. Method of making porous light-weight integrated materials, which comprises as steps preparing a mixture containing finely divided active silica, finely divided active hydrated lime and water in a water to solids ratio greater than 1:1 by weight, to a dispersion of uniformly pourable consistency, shaping the mixture while it is of such consistency and at substantially atmospheric temperature and subjecting the thus shaped mixture to a temperature approximating the boiling point of water substantially without evaporation of water therefrom, thereby to effect a preliminary setting to form-retaining consistency before substantial de-watering or segregation has taken place, and then subjecting the shaped form-retaining body to induration.

3. Method of making porous light-weight integrated materials, which comprises as steps preparing a mixture containing finely divided active silica, finely divided active hydrated lime and water in a water to solids ratio which is greater than 1:1 by weight, to a dispersion of a uniformly pourable consistency, molding the mixture while it is of such consistency and at substantially atmospheric temperature, and subjecting the thus shaped mixture to a temperature approximating the boiling point of water substantially without evaporation of water therefrom, thereby to effect a preliminary setting to self-sustaining structure, removing from the molds, and then subjecting the shaped, self-sustaining body to to induration.

4. Method of making porous light-weight rigid insulating materials, which comprises as steps mixing finely divided active silica, finely divided active hydrated lime and water in a water to solids ratio which is greater than 1:1 by weight, to a dispersion of a uniformly pourable consistency, shaping the mixture while it is of such consistency and at substantially atmospheric temperature, and subjecting the thus shaped mixture to a temperature approximating the boiling point of water substantially without evaporation of water therefrom, thereby to effect a preliminary setting, to a shape- and dimension-retaining structure, before substantial de-watering or segregation has taken place, and then subjecting the shaped, dimension-retaining body to induration.

5. Method of making porous light-weight rigid insulating materials, which comprises as steps mixing finely divided active silica, finely divided active hydrated lime and water in a water to solids ratio which is greater than 1:1 by weight, to a dispersion of a uniformly pourable consistency, shaping the mixture while it is of such consistency and at substantially atmospheric temperature, and subjecting the thus shaped mixture to a temperature approximating the boiling point of water substantially without evaporation of water therefrom, and for a period of time to effect a preliminary setting, to a shape- and dimension-retaining structure, and then subjecting the shaped, dimension-retaining body to induration.

6. Method of making porous light-weight integrated materials, which comprises as steps preparing a mixture containing finely divided active silica, finely divided active hydrated lime and water in a water to solids ratio which is greater than 1:1 by weight, to a dispersion of uniformly pourable consistency, subjecting the mixture while it is of such consistency and at substantially atmospheric temperature, to a preliminary setting at a temperature approximating the boiling point of water substantially without evaporation of water therefrom, manipulating the charge to the shape and dimensions of the ultimately desired product, and subjecting to induration.

7. Method of making porous integrated materials, which comprises as steps preparing a mixture containing finely divided fibrous materials finely divided active silica, finely divided active hydrated lime and water in a water to solids ratio which is greater than 1:1 by weight, to a dispersion of uniformly pourable consistency, shaping the mixture while it is of such consistency and at substantially atmospheric temperature and subjecting the thus shaped mixture to a preliminary setting, at a temperature approximating the boiling point of water substantially without evaporation of water therefrom, and indurating.

8. Method of making porous light-weight insulating materials, which comprises as steps preparing a mixture containing finely divided active silica, and finely divided active hydrated lime and water in a water to solids ratio which is greater than 1:1 by weight, to a dispersion of uniformly pourable consistency, shaping the mixture while it is of such consistency and at substantially atmospheric temperature, and subjecting the thus shaped mixture to a temperature approximating the boiling point of water substantially without evaporation of water therefrom, thereby to effect a preliminary setting to the degree of acquiring a firm surface resistance before substantial de-watering or segregation has taken place, and then subjecting the shaped body to induration.

9. Method of making porous light-weight integrated materials, comprising as steps preparing a mixture containing finely divided active silica, and finely divided active hydrated lime, with water in a water to solids ratio which is greater than 1:1 by weight, to a uniform dispersion and subjecting the mixture while it is of such consistency and at substantially atmospheric temperature, to a preliminary setting at substantially atmospheric pressure and at a temperature approximating the boiling point of water, characterized in that these steps are effected before any substantial de-watering or segregation of the mixture takes place, and wetting the exposed surfaces to control shrinkage by evaporation.

JOHN K. SELDEN.

REFERENCES CITED

The following references are of record in the file of this patent:

UNITED STATES PATENTS

| Number | Name | Date |
|---|---|---|
| 577,060 | Owen | Feb. 16, 1897 |
| 624,900 | Barber | May 16, 1899 |
| 745,476 | Bell et al. | Dec. 1, 1903 |
| 747,193 | Leet et al. | Dec. 15, 1903 |
| 1,569,755 | Irvin | Jan. 12, 1926 |
| 1,666,936 | Kern | Apr. 24, 1928 |
| 1,932,971 | Hutteman et al. | Oct. 31, 1933 |
| 2,326,516 | Brown | Aug. 10, 1943 |
| 2,432,981 | Abrahams et al. | Dec. 23, 1947 |